Patented Aug. 1, 1939

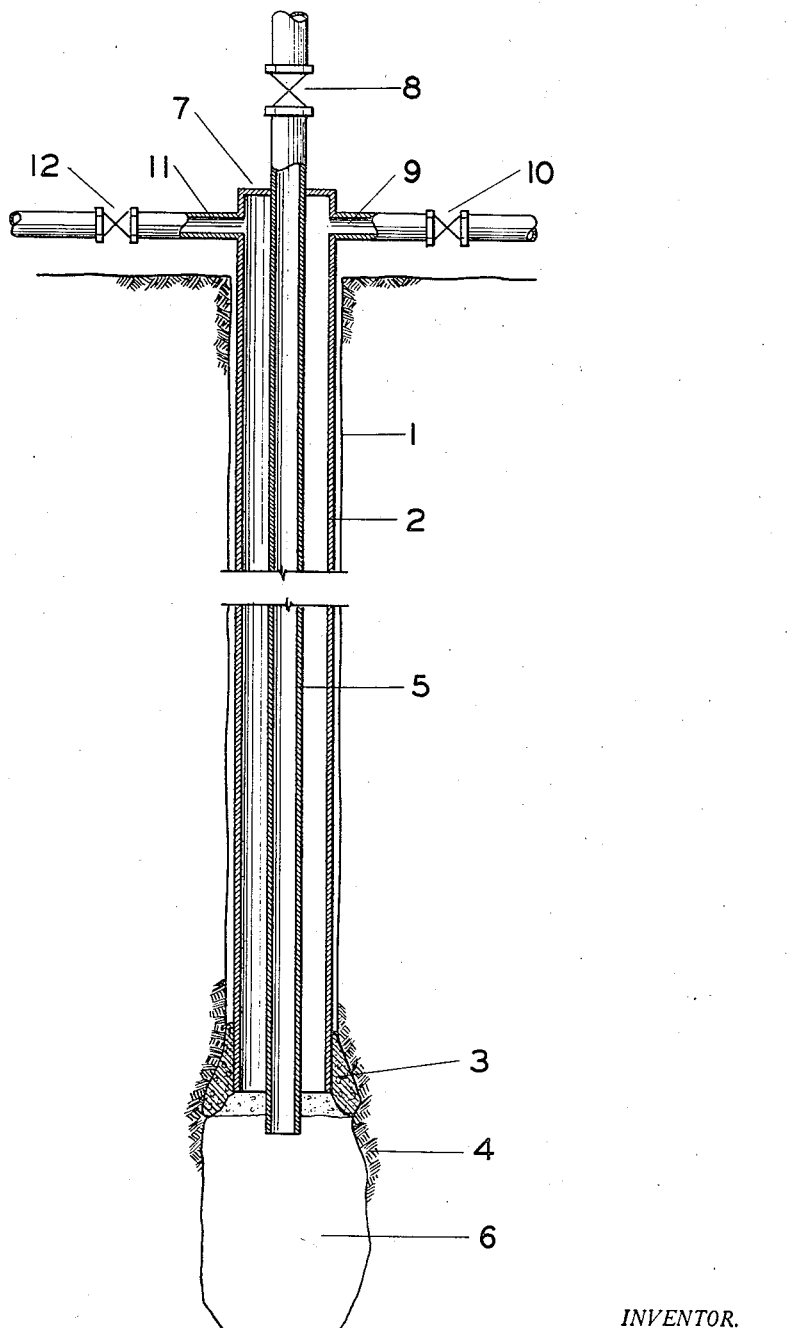

2,168,116

UNITED STATES PATENT OFFICE 2,168,116

METHOD OF FLOWING OIL WELLS

Wilbur J. Crites and William Bruce Lerch, Bartlesville, Okla., assignors to Phillips Petroleum Company, a corporation of Delaware Application May 6, 1937, Serial No. 141,146

2 Claims. (Cl. 166—21)

This invention relates to a method of producing liquids from deep wells by controlling the conditions of solution or mixture of a gas and the liquid being produced.

An important object of the invention is to lighten the column of liquid in a well hole by maintaining a gas in an occluded state in the liquid.

A further important object of the invention is to maintain a foam condition of gas and oil in the flow string of an oil well.

A further important object of the invention is to maintain the oil in the flow string of an oil well in mist form.

Referring to the drawing the figure is a diagrammatic showing of a form of apparatus for practicing the invention.

Oil in its natural state occurs in two general conditions: first, with gas in solution; second, without gas in solution. In the natural flowing wells the foam type of flow has been recognized as the most efficient. In our knowledge no attempt has been made to create a foam condition in an oil well for the purpose of lifting oil. Oil foam is that condition in which there are a multitude of oil and gas globules in contact with each other, each globule being composed of a globule of gas encased in a covering of oil. The nature of foam indicates that the condition in which gas is in solution in the oil is favorable for foam creation, for in the transition of gas in solution to a free state the gas must pass through the foam stage. However, gas can be introduced to oil which does not have gas in solution, for the purpose of creating foam.

In a well in which the oil has gas in solution foam is created at such time as the pressure on the oil is lowered below the critical pressure of gas release. Under normal conditions, if the pressure is progressively lowered the gas that is encased in a covering of oil forming the foam bubbles will expand overcoming the surface tension of the oil film and break, resulting in a mist. It is evident that as long as a foam condition exists, lift efficiency will approach one hundred (100%) per cent for the gas is under a definite control which prevents slippage; but as soon as the oil film is broken, the lift efficiency materially decreases, for the gas is then free to expand and slip by the oil particles which it had previously been carrying with it.

It is obvious that natural conditions may occur in which foam may be generated opposite the producing formation and be delivered in this state at the surface. This condition would occur when the pressure differential or production would cause foam to form at the bottom of the hole and the pressure differential in the flow column would be less than that which would be required to overcome the surface tension of the film of oil which encases the gas globule forming the foam bubble. In fact, foam flow has been observed in practice in which this condition occurred at least in a considerable portion of the upper part of the flow string. In such case, the foam condition was maintained by back pressure on the upper end of the flow column which controlled the expansion of the gas to the extent that the foam was not broken down. It is evident that there will be many conditions in which it would not be possible to control gas expansion in this manner. In seeking for other means to retain gas enclosed in a film of oil so that the foam condition may be prolonged, it is proposed to inject at some point at or above the producing formation a substance which will create a foam and increase the surface tension of oil; also, to inject this substance in such manner that the agitation of injection will cause gas to be released from solution at higher pressures than if not so agitated.

In the drawing reference numeral 1 indicates a well hole having a casing 2 cemented at 3 in the neighborhood of the producing formation 4. Within casing 2 is positioned a flow string 5 which depends into a reservoir 6 at the bottom of the well. Flow string 5 at the surface of the ground projects above casing 2, the space between them being closed at casing head 7. A valve 8 is interposed in flow string 5 above the casing head, the flow string connecting above this point with a separator or similar apparatus (not shown). A conduit for admission of gas under pressure to the reservoir is shown at 9 with an interposed valve 10 and a pipe for the injection of a foaming or defoaming agent at 11 with an interposed valve 12.

The foaming agents used may be substances of a character which may be classified as either water soluble or oil soluble, or both, and may be further classified as either demulsifiers or emulsifiers. For this purpose certain types of commercial soaps may be used by injecting various strength solutions of same in various quantities into the well. Likewise, materials such as starch, gum Arabic, gum Tragacanth, licorice, or various oil or water soluble gums or resins may be applied. It is to be understood that the above disclosure is not intended to limit the types of foaming agents which may be used, particularly as certain types of crude oils of different bases such as asphalt base, asphalt-naphthene or mixed base crudes, or paraffine base crudes may require different types of foaming agents to produce the desired results, depending upon the base or characteristics of the crude. Furthermore the type or kind and amount of foaming agent to be used also depends upon whether or not water or brine is produced along with the crude. Specifically, however, as before stated, it is the intention to add a foaming agent which will create a foaming condition of the oil within the well as desired.

It will be apparent that the foaming agent can be injected at 11 to mix with the oil in reservoir 6. With valve 10 closed the oil will flow up flow string 5 with the pressure in the flow string and reservoir being controlled by valve 8. If desired after the foaming agent has been injected at 11, gas pressure can be applied at 9, valve 8 being held slightly open, so that the foaming agent is forced into the well hole under gas pressure resulting in agitation of the oil therein.

In lifting of oil which has no gas in solution, or not sufficient gas to form the proper amount of foam so that the formation pressure will lift the oil to the surface, extraneous gas under pressure is admitted to the casing through conduit 9 either with or without an agent to increase the surface tension of the oil being injected at 11.

Other than the advantage of effecting a highly efficient lift by this method, the rate of production can more effectively be controlled than by any known method. Since reservoir performance is almost wholly controlled by the performance of the flow string, the efficiency of reservoir performance may be improved by this method of production.

The above method of lifting oil will be effective until such time that formation pressures decline to the point that they will no longer support the column of foam which is essential to obtain the highest efficiency in flow. When this time arrives a reversal of procedure with reference to surface tension treatment is proposed. As previously stated, when gas comes from solution in the oil, it is encased in a film of oil in the form of bubbles; when these bubbles break the lift efficiency is materially reduced. The bubbles when first breaking leave the oil in the form of a fine mist and in this form the lift efficiency although lowered is still relatively high, possibly about 50%. As the small particles of oil which form the mist co-mingle, becoming thereby individually larger, the lift efficiency decreases for the weight of each particle increases in proportion to the cube of the diameter while the surface exposed to energy application increases only in proportion to the square of the diameter. Therefore the finer the mist particles the higher the flow efficiency. When formation pressures will no longer support foam flow, an agent can be introduced that will reduce the surface tension of the oil so that the oil will be held in mist form of fine particles, thereby maintaining a relatively high flow efficiency. Should the volume of formation gas be insufficient to support this type of flow, extraneous gas may be introduced in proper quantities to maintain flow as in the above application of this invention. This substance or solution can be injected in such manner that the agitation or injection of the substance will cause the oil film to be ruptured, causing the gas to be released and freeing the oil. The substance or solution in this case can be a chemical agent which may be classified as either water soluble or oil soluble and having the property of lowering the surface tension of crude oil, and may be classified as a demulsifier. For this purpose certain types of chemicals such as soda ash, water softeners, modified fatty acids, various types of sulphonated oils, or soaps may be used. Various strength solutions of these substances in water may be used and introduced into the well by any practical means such as above described. Also this may be accomplished by introducing into the well bore a quantity of natural gasoline or ordinary gasoline of motor fuel specifications or kerosene or any light petroleum hydrocarbon distillate which if desired can be forced into the reservoir area with the use of gas pressure applied through conduit 9.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

We claim:

1. In a process of producing oil wells in which the oil has gas in solution and the bottom hole pressure of the well is insufficient to force the oil to the surface of the ground which comprises lightening the column of liquid in the well hole by maintaining the gas in an occluded state in the liquid, the process comprising adding a foaming agent to said liquid while in the well hole, agitating the liquid and foaming agent while in the well hole with the producing column being closed off and then opening the producing column and allowing the well to flow under its own pressure.

2. In a process of producing oil wells in which the oil has gas in solution and the bottom hole pressure of the well is insufficient to force the oil to the surface of the ground which comprises lightening the column of liquid in the well hole by maintaining the gas in an occluded state in the liquid, the process comprising adding a foaming agent to said liquid while in the well hole, agitating the liquid and foaming agent while in the well hole by the intermittent addition of gas under pressure from the surface of the ground with the producing column being closed off and then opening the producing column and allowing the well to flow under its own pressure.

WILBUR J. CRITES.
WILLIAM BRUCE LERCH.